Patented July 27, 1926.

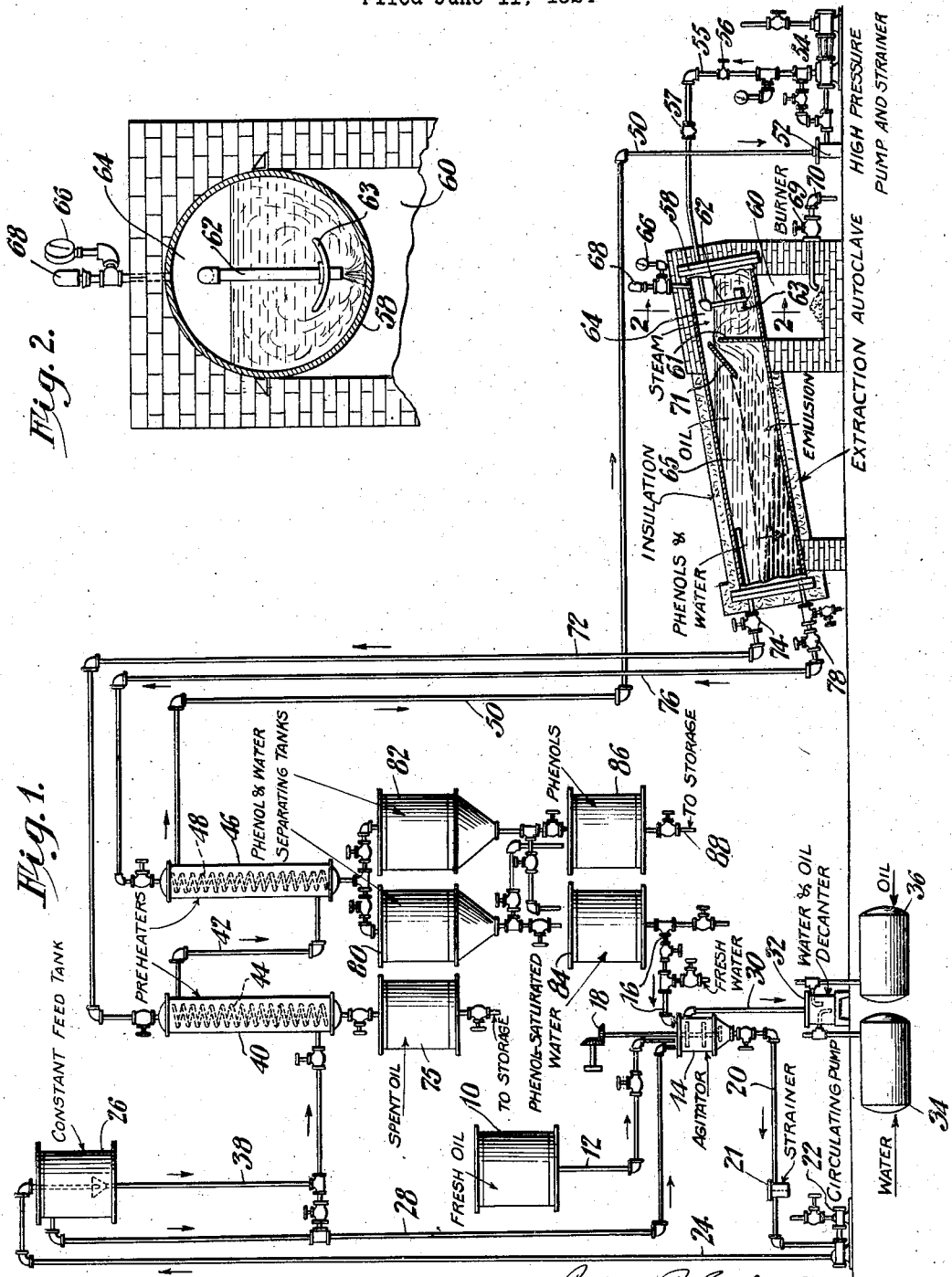

1,594,024

UNITED STATES PATENT OFFICE.

ROLAND P. SOULE, OF NEW YORK, N. Y., ASSIGNOR TO COMBUSTION UTILITIES CORPORATION, OF NEW YORK, N. Y., A CORPORATION OF MAINE.

EXTRACTION APPARATUS.

Application filed June 11, 1924. Serial No. 719,281.

This invention relates to an extraction apparatus, and particularly to an apparatus in which the soluble components of a liquid mixture can be continuously extracted under pressure.

This invention is designed to permit the economical application to industrial extraction problems of the principle that the extracting power of a solvent increases with the temperature of extraction. It is designed particularly for use with solvents which in order to be valuable in certain applications have sufficiently great extracting powers only if they are employed at temperatures in excess of their boiling-points. Water, for example, may be such a solvent. Thus, the phenols in a phenol-bearing oil such as a coal-tar distillate are only slightly soluble in water at room temperature (20° C.). They are more soluble in boiling water (100° C.), but still insufficiently soluble to be economically extracted. They are extremely soluble in water above 200° C., however, and can be extracted successfully at such temperatures.

The difficulties involved in the development of an apparatus in which this principle can be utilized efficiently are two-fold, and are sufficiently great to have prevented its extensive commercial application before the present time. In the first place, the principal operations of the extraction process, such as agitation, settling, and the separation of layers, must all be performed under pressures sufficiently high to maintain the solvent in its liquid phase at the elevated temperatures in question. In the second place, considerations of economy in both plant investment and operating expenditures require in addition that these various operations of the process be conducted continuously and without interruption. In intermittent operation the production capacity of the extraction apparatus is diminished in proportion to the time lost in heating its contents to the desired temperature. Moreover, the fuel requirements are excessive to the extent that heat is lost from the hot products of extraction. A high thermal economy of operation can be obtained only when such heat is transferred to the incoming cold charge. This transfer can be accomplished efficiently only when the liquid mixture and its solvent are introduced continuously and when the products of extraction are withdrawn continuously.

One object of the present invention is to provide an apparatus in which a liquid mixture can be subjected under pressure to the various operations of extraction, such as agitation, settling, and the separation of layers.

Another object of the invention is to provide an apparatus in which these operations can be conducted continuously and without interruption.

Another object of the invention is to provide an apparatus in which the soluble components of a liquid mixture can be extracted under conditions whereby a transfer of heat can be efficiently effected between the liquids charged into and discharged from said apparatus.

Another object of the invention is to provide an apparatus by means of which water can be used as the solvent in the commercial extraction of phenols from phenol-bearing oils, such as coal-tar distillates and similar liquid mixtures.

Other objects and features of the invention will appear in the following description and in the claims.

A schematic illustration of a preferred arrangement of the apparatus forming the subject matter of the present invention is given in the accompanying drawing, showing the application of the invention to the aqueous extraction of phenols from a phenol-bearing oil.

In the drawing Fig. 1 is a view, partly in elevation and partly in section, which shows the extraction autoclave and its arrangement with auxiliary pumping, separating, mixing and preheating units to form a closed circuit for the solvent, and Fig. 2 is a cross sectional view of the interior of the autoclave taken on the line 2—2 of Fig. 1.

The apparatus constituting the preferred form of the invention consists essentially of an autoclave or pressure vessel divided into a mixing or extraction chamber and a settling chamber, and connected by supply pipes and discharge pipes to auxiliary pumping, separating, mixing and heat exchanging or preheating units. The autoclave is preferably supported at an angle to the horizontal. The mixing chamber is preferably enclosed within the combustion zone of a heating furnace, so that the heat necessary to obtain the desired temperature can be supplied to the material while it is being extracted with the solvent. In the operation of the apparatus the liquid to be extracted, mixed with the solvent in a fixed proportion, is charged into the mixing chamber through a spray nozzle in such a way as to create a continuous circulation and agitation of the charge throughout the period of its extraction therein. Heat is applied directly to the bottom and side walls of the mixing chamber and the charge in both chambers is maintained at a temperature above the boiling point of the solvent and under sufficient pressure to prevent its ebullition. As a result both of the increased solubility and reduced viscosity of the charge at this high temperature and of the thorough agitation induced by the method of charging, extraction can be made to take place almost as rapidly as fresh liquid is introduced. This fresh liquid is continuously charged into the mixing chamber and a loose emulsion of the extract with the insoluble components of the liquid is continuously displaced over a baffle plate or weir into a settling chamber. In this settling chamber the emulsion is maintained in a quiescent state at the same pressure and substantially the same temperature as exist in the mixing chamber. Under these conditions the emulsion rapidly separates into layers of its component parts, i. e., the solution of the soluble components in the solvent and the insoluble components. These layers settle to the bottom or rise to the top of the chamber, according to their relative specific gravities, and are continuously and separately discharged from the settling chamber. The charging pump and valves in the discharge pipes, moreover, are so regulated that the liquids are charged into the autoclave and discharged therefrom at a rate not in excess of that at which the extraction and separation of layers is completed therein. The hot effluents discharged from the settling chamber pass through auxiliary preheating equipment in heat interchanging relationship with the mixture of the solvent and the liquid to be extracted on their way to the mixing chamber. By this means heat carried from the autoclave by the departing liquids is utilized in preheating the entering liquids, and the thermal economy of the process is considerably increased.

The above description refers to the broad essential features of the present invention, and the apparatus and arrangement described may be adapted for use with many types of extraction processes. The following detailed description, however, will be limited to the specific application of the apparatus to the aqueous extraction of phenols from a phenol-bearing oil as illustrated by the accompanying sketches. The process disclosed in this connection forms the subject of a separate invention, for which a patent application has been filed May 31, 1924, Serial No. 716,899, by Stephen P. Burke.

The liquid to be extracted in this particular application of the invention is described as a phenol-bearing oil or as "fresh oil." This oil is pumped or otherwise introduced into a tank 10. From the tank 10 the fresh oil is led through a pipe 12 to a mixing tank 14, wherein it is mixed with water introduced through a pipe 16,—water in this case serving as a solvent or extraction agent. The agitator and most of the other auxiliary equipment hereinafter described may be of any standard type. The agitator illustrated in the drawings is shown equipped with paddles driven by a power shaft through gears 18. After being thoroughly mixed in the agitator the mixture of fresh oil and water is passed through a pipe 20, carrying a strainer 21, into the cylinder of a circulating pump 22, which raises it by a pipe line 24 to a constant gravity supply tank 26. Any overflow from the supply tank 26 is returned to the agitator by a pipe 28, and to provide against overflow from the agitator 14 a drawoff pipe 30 is so connected that any excess oil and water overflows and is conducted to a water-oil decanter 32, where the water and oil separate and can be run off to respective storage tanks 34 and 36. From the constant feed or supply tank 26 the properly proportioned mixture of oil and water is passed through a pipe 38 into the bottom of a preheater or heat exchanger 40, wherein it is gradually heated as it rises toward an outlet pipe 42 by heat transfer with previously heated liquids passing downwardly through a coil 44. From the preheater 40 the mixture of oil and water passes through the pipe 42 into the bottom of another heat exchanger or preheater 46, similar in design to preheater 40, wherein the mixture is further heated by heat transfer with other hot liquids passing through coil 48. From the preheater 46 the mixture of oil and water passes through a pipe 50 and a strainer 52 into the cylinder of a high pressure feed pump 54 and is forced by this pump through a pipe 55 and a control valve 56 and check valve 57 into an antoclave 58. If further preheating of the charging mixture of oil and water is found necessary it may be accomplished by passing it through other heat interchanging apparatus, preferably connected in the line at some point between the charging pump 54 and the check valve 57. Heat necessary for the additional preheating can be supplied by the hot gaseous products of combustion from the heating furnace shown, or in any other feasible manner.

The autoclave 58 consists essentially of a cylindrical pressure vessel which is supported at an angle with the horizontal and has its upper end enclosed within a furnace combustion chamber 60. The lower exposed end of the autoclave, which lies outside of the furnace setting is preferably protected by a coating of heat insulating material to prevent loss of heat by radiation. The several charging pipes 42, 50 and 55, the cylinders of the charging pump 54, and the preheaters 40 and 46 may also be wrapped to advantage with similar heat insulating material. The length of the autoclave cylinder and the angle at which it is supported are both determined by the rate at which material can be passed through the autoclave, which in turn depends on the rate at which the extraction is completed, or at which the aqueous solution of the phenols subsequently separates by gravity action from the insoluble residual oil.

The inside of the autoclave is divided by a vertical weir or baffle plate 61 into two sections or chambers. The smaller section is in the upper end of the autoclave and is entirely enclosed by the furnace combustion chamber, and it is into this section that the feed pipe 55 discharges. To the pipe 55 is attached a spray nozzle 62 which is provided with jet openings through which the mixture of oil and water is directed with high velocity against the hot bottom of the autoclave. By this means the mixture of hot oil and water is introduced below the surface of the charge and is directed by a baffle plate 63, as shown in Fig. 2, to pass upwards along the hot walls of the upper or mixing chamber. Gas or other fuel is burned in the combustion chamber of furnace 60, and the heat generated thereby is transmitted through the walls and bottom of the autoclave to the charge in the mixing chamber. By thus heating the bottom of the autoclave and by causing the preheated stream of the oil-water mixture charged through nozzle 62 to impinge in numerous small jets traveling at high velocity against the hot bottom, that portion of the body of the charge in the upper or mixing chamber of the autoclave is maintained at the desired temperature and is kept in a state of continuous circulation and vigorous agitation. The top of the weir 61 is spaced from the roof of the autoclave a sufficient distance so that there is provided above the surface of the charge in both chambers a vapor space 64 sufficiently large to permit slight nonconformity between rates of charging and discharging without resulting in excessive pressure changes. As the aqueous solution of phenols and the insoluble residual oil in the loose emulsion formed by the intimate mixing and agitation of the oil and water in the mixing chamber are displaced by the incoming mixture they flow continuously over the top of the weir 61 into the larger settling chamber 65, comprising the lower section of the autoclave.

The vapor space 64 overlies both the upper or mixing chamber and the lower or settling chamber, and the pressure within this vapor space is maintained high enough to prevent boiling of the water and oil contained in the autoclave. A pressure gauge 66 and a safety valve 68 are attached to the top of the autoclave, in communication with the vapor chamber, and the safety valve prevents the attainment of dangerous pressures within the apparatus. A thermostatically controlled valve 69 in a fuel line 70 leading to the furnace combustion chamber provides the means by which the temperature within the autoclave can be automatically regulated. The pressures within the autoclave can be regulated by automatic pressure control of the valve on the high pressure feed pump 54. A second baffle plate 71 is supported by the walls of the autoclave at an angle with the horizontal to deflect the stream of emulsion flowing over the vertical baffle plate 61, and to force it to take a downward course below the supernatant aqueous solution of phenols. There is no direct application of heat or other agency to promote circulation of the charge in section 65, and a quiet settling zone is thus maintained therein, where the emulsion rapidly separates into aqueous solution of phenols and the insoluble residual oil. The aqueous solution quickly settles to the bottom of chamber 65, while the lighter insoluble residual oil rises to the top. The liquid charge in this section of the autoclave is therefore composed of three distinct layers, namely, an upper layer of oil, an intermediate layer of emulsified oil and aqueous solution, and a bottom layer of the aqueous solution of phenols. The sectional elevation taken through the axis of the autoclave as illustrated in Fig. 1 of the drawing shows that at the upper end of chamber 65 adjacent to the baffle plates 61 and 71 the single liquid phase, e. g., the emulsion, has a depth substantially equivalent to the total depth of the charge at that point. However, it will be noticed that as the emulsion advances toward the outlet pipes at the lower end of chamber 65 its depth or thickness rapidly decreases because of its separation into oil and aqueous components, so that its longitudinal section assumes roughly the shape of a V lying on its side, with the apex on the plane of demarcation between the oil and aqueous layers. The apex of the V will shift to the right whenever the rate of separation of emulsion into its aqueous and insoluble oil components increases. Conversely, the slower this rate of separation the greater will be the thickness of this layer of emulsion at the lower end of chamber 65 adjacent to the discharge pipes. In Fig. 1 a curved dotted line has been drawn to indicate what is thought to approximate the curve in which the interface between the emulsion and the upper layer will form. This interface will flatten out as it approaches the point at which the separation of the emulsion into oil and aqueous components is completed, and from that point to the discharge end of the autoclave the plane of demarcation between the oil and aqueous components will of course be represented by a straight horizontal line.

The insoluble residual or spent oil is removed from chamber 65 through a discharge pipe 72, equipped with a valve 74, and is conducted by this pipe to coil 44 of preheater 40, through which it flows in heat interchanging relationship with liquids passing to the autoclave through the outer chamber of the preheater. From the preheater 40 the cooled oil is withdrawn into a tank 75 and is thence conducted to storage. The aqueous solution of phenols is removed from chamber 65 separately from the insoluble residual oil through a pipe 76, equipped with a valve 78. It is conducted through coil 48 of the preheater 46 and is thus cooled by heat interchange with the feed mixture of water and phenol-bearing oil passing to the autoclave. The solution is then exhausted into one of two separating tanks 80 and 82, where it is further cooled if necessary. The phenols which are dissolved by water at the high temperature prevailing in the autoclave are relatively insoluble in water at the low temperature which is maintained in the separating tank, and accordingly the phenols and the extraction water rapidly separate into layers. The phenol-saturated extraction water is run off into tank 84 and from there it can be passed through pipe 16 into the agitator 14 to be recirculated through the system in admixture with fresh oil. The crude phenols are drawn off from tanks 80 and 82 to a tank 86 and are passed from this tank to storage through a pipe 88. The tanks 80 and 82 can be provided with cooling coils if additional cooling is necessary, and the charging and discharging pipes are equipped with valves so that both tanks can be used alternately. These tanks are of sufficient capacity so that while one is being filled the layers of phenol and phenol-saturated water have sufficient time to separate out in the other tank and be drawn off into their respective storage lines.

It will be apparent that the chief apparatus feature of the invention, namely the divided and inclined cylindrical autoclave and the appurtenant charging and discharging equipment, can be used with a great number of combinations of auxiliary apparatus. This auxiliary apparatus may be widely different in construction, design and arrangement from that described in the foregoing discussion and illustrated in the drawings without departing materially from the broad principle of the invention. Each class of extraction processes has its own particular features and auxiliary apparatus requirements, and while the above description has been of necessity limited to one specific arrangement, such as is preferred for phenol extraction when water is used as the extraction agent, it is not intended by such description to limit the scope of the invention specifically to that one arrangement of apparatus, even so far as apparatus for phenol recovery is concerned.

It has already been stated that the chief purpose of the invention is to provide apparatus which is suitable for a process of continuous extraction under pressure. The control of the apparatus presents no problems of particular difficulty. The feed to the high pressure pump 54 is always constant and is determined by the static head in the tank 26. This head is maintained by the circulating pump 22, which is operated so that there is always a slight overflow into the agitator 14. The pressure in the autoclave 65 is determined both by the temperature of the charge and the rate of charging. The temperature is preferably maintained constant by thermostatic control of the fuel valve 69, and the rate of charging is controlled by the steam valve on the high pressure feed pump 54, which in turn may be governed in accordance with the pressure in the autoclave. Further pressure regulation is possible by hand manipulation of valves 74 and 78 on the discharge line.

The autoclave itself need not conform exactly to the design shown in the drawings, but regardless of type it is preferably supported at a slight angle from the horizontal. The chief objects of this inclination are:—

(1) To provide a vapor space that is located entirely over the hot mixing chamber, and only partially over the settling chamber of the same vessel.

(2) To provide a greater depth of layers in the settling chamber so that the products of extraction can be removed without danger of their becoming mixed with each other or with the emulsion.

The safety valve 68 is set to blow at a pressure corresponding to a temperature somewhat higher than that at which the extraction is conducted. When extracting phenols by water from the middle oil fractions of coal tar, it has been found that the best compromise between the yield and purity of the product is obtained at temperatures ranging from 200° to 225° C., and under pressures ranging between 15 and 25 atmospheres. Under these conditions the total time required for the extraction and subsequent gravity separation of the emulsion into its component layers of aqueous solution of phenols and of insoluble residual oils is usually less than five minutes.

The preferred form of the invention having been thus described, what is claimed as new is:

1. An extraction apparatus comprising a vessel closed for operation at super-atmospheric pressure and having its interior divided into a mixing chamber and a settling chamber, means for introducing raw material to be extracted and a solvent into the mixing chamber and for agitating it, means for maintaining the charge in the vessel at an elevated temperature, and means for removing solution of extracted material from the settling chamber separately from insoluble residue.

2. An extraction apparatus comprising an autoclave closed for operation at super-atmospheric pressure, means dividing the interior of the autoclave into a mixing chamber and a settling chamber and arranged to allow material to pass from the mixing chamber to the settling chamber while maintaining a charge in the settling chamber in a quiescent state, means for introducing material to be extracted and a solvent into the mixing chamber, said means being arranged to agitate the charge therein, means for maintaining the charge in the autoclave at an elevated temperature, and means for removing solution of extracted material from the settling chamber separately from insoluble residue.

3. An extraction apparatus comprising an autoclave, a baffle plate dividing the interior of the autoclave into a mixing chamber and a settling chamber and arranged to maintain the charge in the settling chamber in a quiescent state, said baffle plate having its top spaced from the roof of the autoclave to permit emulsion of extracted liquid and solvent to flow from the mixing chamber into the settling chamber, means for introducing liquid to be extracted and a solvent into the mixing chamber, said means being arranged to agitate the charge therein, means for heating the charge, means for maintaining the charge in the autoclave at an elevated temperature and pressure, and means for separately removing the soluble and the insoluble components of the liquid to be extracted from the settling chamber.

4. An extraction apparatus comprising an autoclave, means dividing the interior of the autoclave into a mixing chamber and a settling chamber, said means being arranged to permit material to flow from the mixing chamber to the settling chamber, a charging nozzle arranged to introduce liquid to be extracted and a solvent into the mixing chamber and to agitate the charge therein, means for heating the charge, means for maintaining the charge in the autoclave at an elevated temperature and pressure, and means for separately removing the soluble and insoluble components of the liquid to be extracted from the settling chamber.

5. An extraction apparatus comprising an autoclave closed for operation at super-atmospheric pressure, a baffle plate dividing the interior of the autoclave into a mixing chamber and a settling chamber with a vapor space overlying and common to both chambers, means for continuously introducing liquid to be extracted and a solvent into the mixing chamber, means for continuously and separately removing the soluble and insoluble components of the liquid to be extracted from the settling chamber, and means for maintaining the charge at the desired temperature and pressure.

6. An extraction apparatus comprising an autoclave closed for operation at super-atmospheric pressure, means for continuously introducing a charge of liquid to be extracted and a solvent into the autoclave, and for agitating the charge in one part of the autoclave, means for maintaining the charge in the autoclave at an elevated temperature and pressure, and discharge pipes vertically spaced from each other and arranged to remove the soluble and insoluble components of the liquid to be extracted continuously and separately from the autoclave.

7. An extraction apparatus comprising a cylindrical autoclave supported with its axis at an angle to the horizontal, means dividing the interior of the autoclave into an upper or mixing chamber and a lower or settling chamber, charging means for introducing liquid to be extracted and a solvent into the upper or mixing chamber of the autoclave and for agitating the charge therein, means for heating the charge, means for maintaining elevated temperatures and pressures within the autoclave, and means for separately removing the soluble and insoluble components of the liquid to be extracted from the lower or settling chamber of the autoclave.

8. An extraction apparatus comprising an autoclave having its interior divided into a mixing chamber and a settling chamber, means for continuously introducing liquid to be extracted and a solvent into the mixing chamber, means for maintaining the charge in the autoclave at an elevated temperature and pressure, means for continuously and separately removing the soluble and insoluble components of the liquid to be extracted from the settling chamber, means for cooling the solution of the soluble components, and a settling tank having an inlet for the mixture of solvent and extract precipitated by the cooling of the solution and a valved outlet for removing the layers of solvent and extract separated by gravity separately therefrom.

9. An extraction apparatus comprising an autoclave having its interior divided into a mixing chamber and a settling chamber, a preheater having heating and cooling compartments, means for continuously passing a charge of liquid to be extracted and a solvent from the heating compartments of the preheater into the mixing chamber, and for agitating the charge in the mixing chamber, means for maintaining the charge in the autoclave at an elevated temperature and pressure, and means for continuously passing hot solution of soluble components of the liquid to be extracted from the settling chamber through the cooling compartments of the preheater in heat interchanging relationship with the liquid passing through the heating compartments to the mixing chamber.

10. An extraction apparatus comprising an autoclave closed for operation at superatmospheric pressure and an agitator arranged to thoroughly mix liquid to be extracted with fresh or previously saturated solvent, means for passing said mixture from the agitator into the autoclave, means for agitating the charge in one portion of the autoclave, means for maintaining simple settling of the charge into layers of solution of soluble and of insoluble components of the liquid in another portion of the autoclave, means for maintaining the charge at an elevated temperature and pressure, means for separately removing solution of soluble components and insoluble components from the autoclave, means for cooling the solution of soluble components to separate the extract from the solvent, and means for returning the saturated solvent to the agitator.

11. An extraction apparatus comprising an autoclave closed for operation at superatmospheric pressure, means for dividing the interior of the autoclave into a mixing chamber and a settling chamber having a common vapor space, means for introducing a charge of liquid to be extracted and a solvent into the mixing chamber and for agitating the charge in the mixing chamber, means for maintaining the charge at an elevated temperature, and a pressure relief or safety valve connected with the vapor space at the top of the autoclave and set to blow at a pressure in excess of that required to maintain the desired temperature within the autoclave.

12. An extraction apparatus comprising an autoclave having its interior divided into a mixing chamber and a settling chamber, means for continuously introducing a mixture of liquid to be extracted and a solvent into the mixing chamber, means for heating the charge, means for maintaining the charge in the autoclave at the desired temperature and pressure, means for continuously removing the soluble and insoluble components of the liquid to be extracted separately from the settling chamber, means for controlling the rate at which the mixture is introduced into the autoclave, and other means for controlling the rate at which the soluble and insoluble components are removed therefrom.

13. An extraction apparatus comprising an autoclave designed for operation at superatmospheric pressure, means dividing the interior of the autoclave into a mixing chamber and a settling chamber, a charging nozzle arranged to discharge below the level of the charge in the mixing chamber, a number of discharge pipes leading from the settling chamber at different levels, a constant gravity feed tank and a charging pump with connections for continuously introducing liquid to be extracted and a solvent into the mixing chamber, and means for continuously and separately removing soluble and insoluble components of the liquid to be extracted from the settling chamber through separate discharge pipes.

14. An extraction apparatus comprising an autoclave, means for supporting the autoclave at an angle to the horizontal, means for heating the upper part of the autoclave, a charging nozzle arranged to introduce material to be extracted into the upper enclosed part and a discharge pipe in the lower part of the autoclave for removing solution of extracted material therefrom, a preheater arranged to cool solution of extracted material removed from the autoclave by heat transfer with material to be extracted, a separating tank with a draw-off pipe for withdrawing separately the layers of extracted material and solvent components separated by gravity from the cool solution, and an agitator for mixing solvent with fresh material to be extracted.

15. An extraction apparatus comprising an autoclave connected with an agitator, preheaters, separating tanks and pumping equipment, a furnace structure supporting the autoclave at an angle and arranged for the combustion of fuel to furnish heat to maintain the interior of the autoclave at a desired elevated temperature, a pressure relief valve on the autoclave set to maintain a corresponding super-atmospheric pressure therein, valves for regulating the rate of charging the autoclave with material to be extracted, valve for regulating the rates at which solution of extracted material and insoluble residue are removed from the autoclave, and means dividing the charge in the autoclave into an extraction zone and a settling zone wherein solution of extracted material and insoluble residue can separate into layers according to their relative specific gravities.

In testimony whereof I affix my signature.

ROLAND P. SOULE.